Nov. 30, 1954     W. G. KOLANDER     2,695,712
SERVING TRAY

Filed Dec. 10, 1951     3 Sheets-Sheet 1

INVENTOR.
WILLIAM G. KOLANDER
BY
Townsend and Townsend
ATTORNEYS

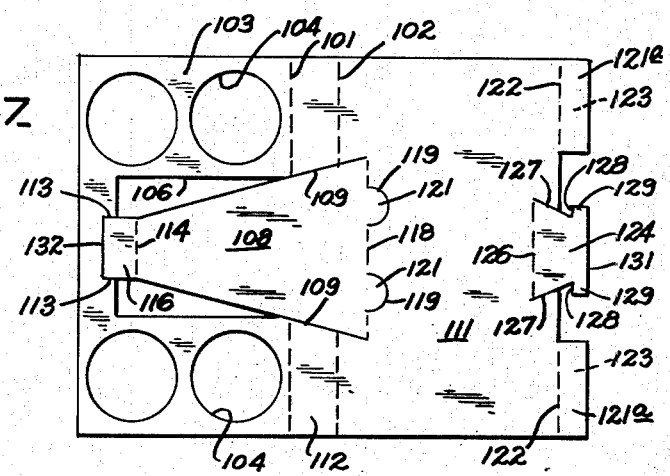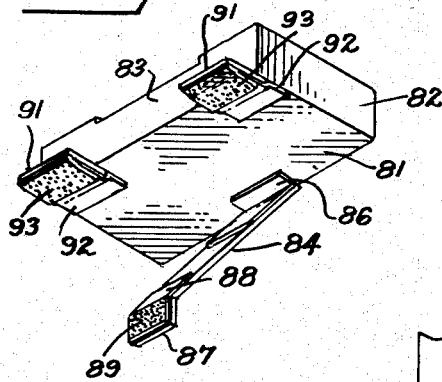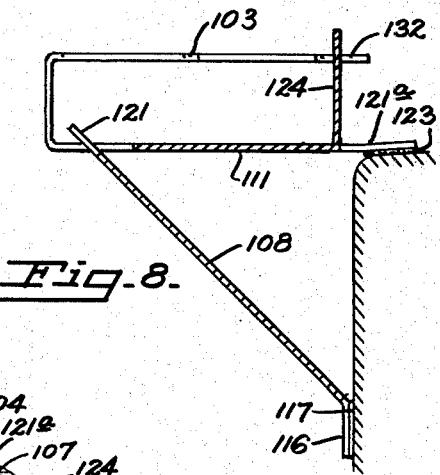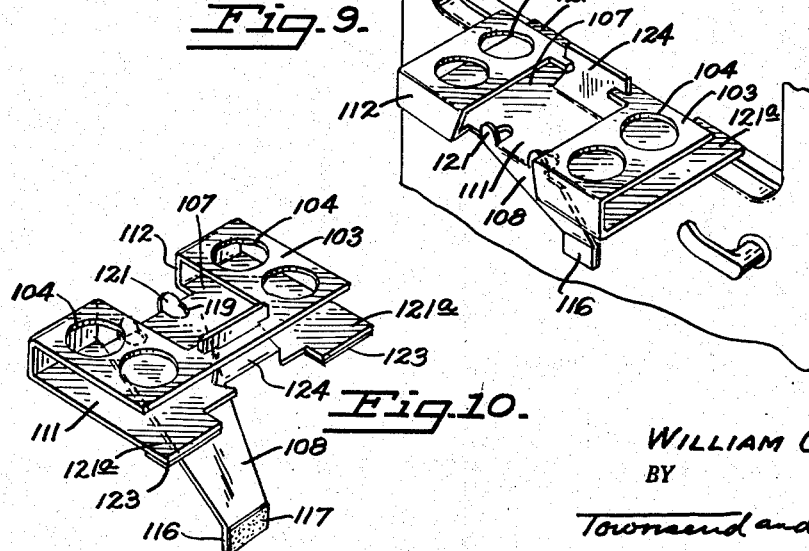

Nov. 30, 1954 — W. G. KOLANDER — 2,695,712
SERVING TRAY
Filed Dec. 10, 1951 — 3 Sheets-Sheet 3
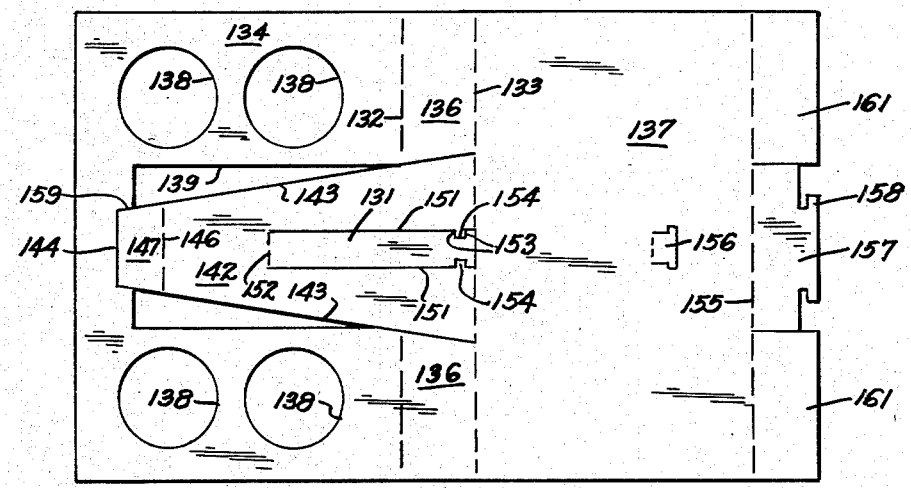
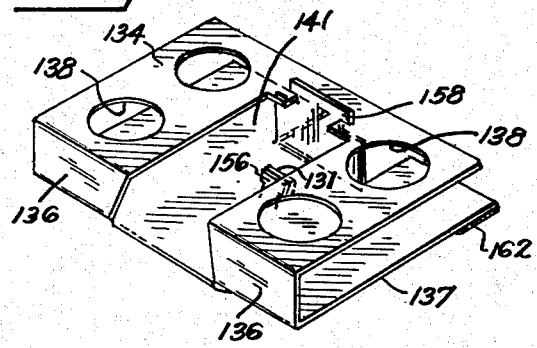
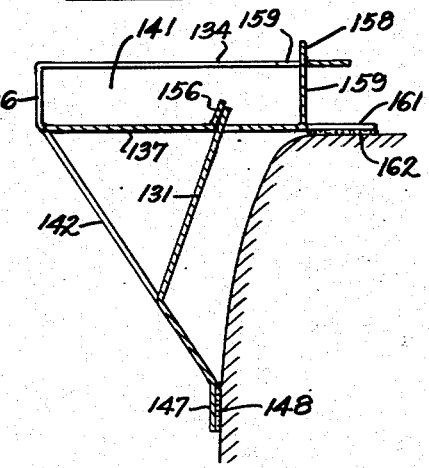
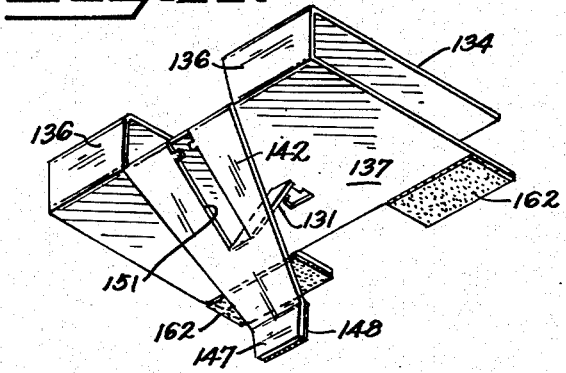
INVENTOR.
WILLIAM G. KOLANDER
BY
Townsend and Townsend
ATTORNEYS

United States Patent Office 2,695,712
Patented Nov. 30, 1954

2,695,712

SERVING TRAY

William G. Kolander, National City, Calif.

Application December 10, 1951, Serial No. 260,866

3 Claims. (Cl. 211—74)

This invention relates to new and useful improvement in serving trays. More particularly, the invention relates to a simple and inexpensive tray in which articles may be transported and which may be attached to a stationary support such as the window ledge or dashboard of an automobile, or the like. The invention has particular application in the provision of a dispensing tray which may be used in drive-in restaurants, drive-in theaters and similar places to carry refreshments from a dispensing station to an automobile and thereupon attached to a vehicle by means hereinafter described.

One preferred embodiment of the tray is formed from a rectangular blank of material by conventional forming equipment and is therefore conveniently transportable from the point of manufacture to the point of distribution, is inexpensive to make, and to assemble.

The tray is preferably provided with a plurality of holes in which cups, glasses, and bottles may be placed and also a compartment in which solid foods may be held.

Other objects of the present invention will become apparent upon reading the following specification and referring to the accompanying drawings in which similar characters of reference represent corresponding parts in each of the several views.

In the drawings:

Fig. 6 is a perspective view of another modification as viewed from below.

Fig. 7 is a plan of a blank of another modification.

Fig. 8 is a vertical midsection through the assembled tray formed of the blank of Fig. 7 attached to an automobile window ledge.

Fig. 9 is a perspective of the tray of Fig. 8.

Fig. 10 is a perspective of the same modification taken from a different direction.

Fig. 11 is a blank of a further modification.

Fig. 12 is a vertical midsection through the assembled tray formed of the blank of Fig. 11 attached to an automobile dashboard.

Fig. 13 is a perspective of the tray of Fig. 12.

Fig. 14 is a perspective of the same modification taken from a different direction.

As has been stated, the instant device has practical application as a tray in which glasses, cups, and bottles as well as sandwiches and other solid food may be transported from a dispensing station such as a kitchen, and, if desired, subsequently attached to a stationary support, such as an automobile, while the food is being consumed.

Figure 1:
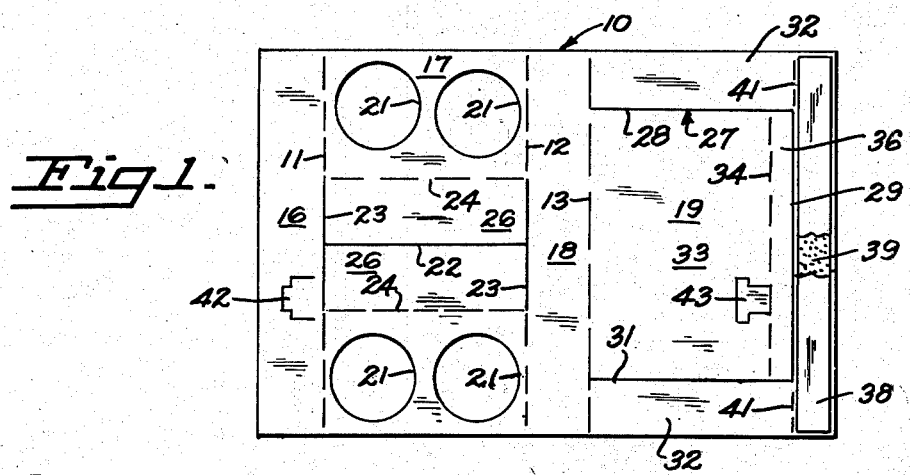
Fig. 1 is a plan view of a blank from which the tray is formed.

The device is preferably formed of chipboard, corrugated paper, or similar inexpensive, relatively easily disposable material. A rectangular blank 10 of said material is provided. Said blank, as shown particularly in Fig. 1, has three transverse fold lines extending across the blank, the first fold line 11 being disposed a short idstance from the left margin of the blank, said distance being equal to the height of the completed tray. The second fold line 12 is disposed a distance from first fold line equal to the width of the completed tray. The third fold line 13 is spaced from the second fold line 12 approximately the same distance as first fold line 11 is spaced from the left margin of the blank, said third fold line 13 being also spaced from the right hand margin of the blank a distance substantially greater than the distance between first and second fold lines 11 and 12, respectively. Said fold lines thus define four transversely-extending panels, designated in the accompanying drawings, proceeding from left to right as 16, 17, 18, and 19, respectively.

A plurality of circular cutouts 21 is formed in panel 17 between first and second fold lines 11 and 12, respectively, said cutouts being of a diameter such as conveniently to receive conventional cups, bottles, and glasses.

In the center of panel 17 there is formed a longitudinal slit 22 and transverse slits 23 intersecting said longitudinal slit 22 at each end of said panel. Longitudinal fold lines 24 parallel to slit 22 are formed connecting the ends of transverse slits 23. This provides a pair of flaps 26 which may be folded down to provide a receptacle for sandwiches and the like as shown particularly in Figs. 2 and 4.

Right hand panel 19 is formed with a U-shaped slit 27 one leg 28 of which extends longitudinally from fold line 13 spaced inwardly from the top margin of the blank sufficiently to provide stock which will afford a solid supporting bracket for the tray, said distance being preferably about one and one-half inches, a second leg 29 extending parallel to the right margin of the blank and spaced therefrom about one inch, and the third leg 31 extending longitudinally back parallel to the longitudinal margin of the blank to an intersection with fold line 13. It will thus be seen that U-shaped slit 27 provides a U-shaped supporting leg 32 for the tray and also a substantially rectangular bottom 33. Preferably, a transverse fold line 34 is formed spaced inwardly from and parallel to leg 29 a distance of about one inch to provide an attaching flap 36 for the tray.

Sticky tape 37, preferably provided with a covering material (not shown) which is removable after the food has been placed in the tray, is attached to the underside of the blank on flap 36 between transverse fold line 34 and leg 29 and similar sticky tape 39 preferably provided with a covering material is attached to the top of the blank in the space between slit 29 and right marginal edge of the blank. Short transverse fold lines 41 are formed as lateral extensions of leg 29 extending out to the longitudinal margins. Further, interlocking tabs 42 and 43 are formed in panel 16 adjacent transverse fold line 11 and in bottom 33 adjacent fold line 34, respectively.

Figures 2, 3:
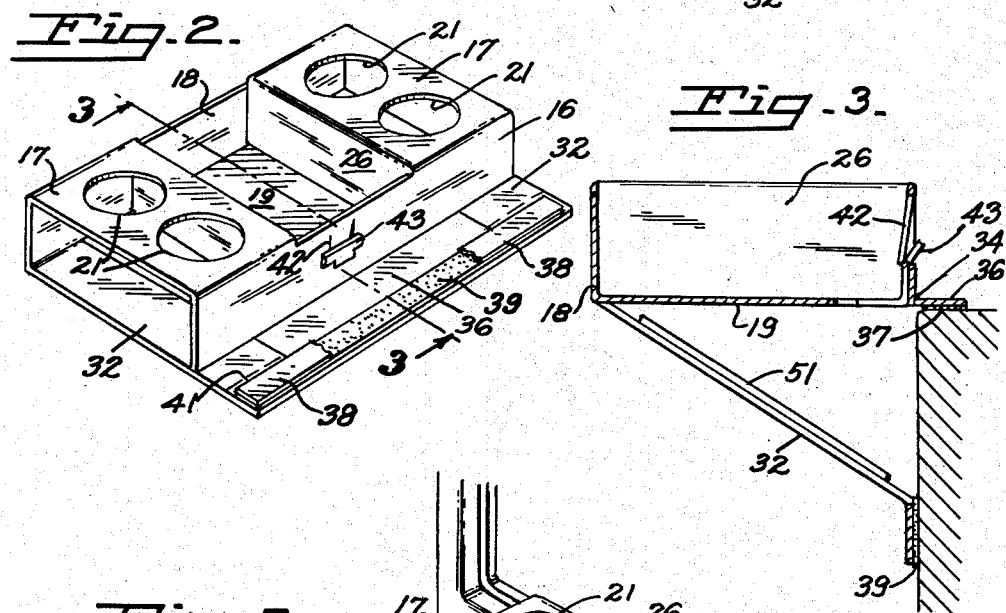
Fig. 2 is a perspective of the device assembled for transportation from the dispensing station to the vehicle.
Fig. 3 is a sectional view taken substantially along the line 3—3 of Fig. 2 and modified to show the tray attached to a window ledge of an automobile.

Assembly of the tray for transporting food from the dispensing station to the vehicle is accomplished by folding panels 16, 17, 18, and 19 inwardly and interlocking tabs 42 and 43 to form a hollow rectangular box open at either end as shown particularly in Fig. 2. The top of said box is apertured to provide openings 21 in which may be placed cups, glasses, bottles and the like and also by means of slits 22 and 23 to provide a central receptacle for sandwiches and the like. Bottom 33 prevents articles from falling through the box.

After the tray has been transported to the automobile or other stationary support therefor, the U-shaped leg 32 is folded downwardly, the extremities of fold line 13 serving as a hinge, the protective covering 38 over tapes 37 and 39 being removed and flap 36 being adjusted by bending along transverse fold line 34 so that sticky tape 37 fixed to the bottom thereof fastens to a convenient support such as the window ledge, dash board, or other portions of an automobile and tape 39 attaches to some other lower convenient portion of the automobile such as the side of the door. It will thus be seen that flap 36 and U-shaped leg 32 adequately support the weight of the articles in the tray.

Reinforcements such as pieces of thin wood 51 may be installed along the parallel parts of leg 32 to prevent buckling under the weight of the articles in the tray if required, and reinforcing may be appended at all hinges if required.

Figures 4, 5:
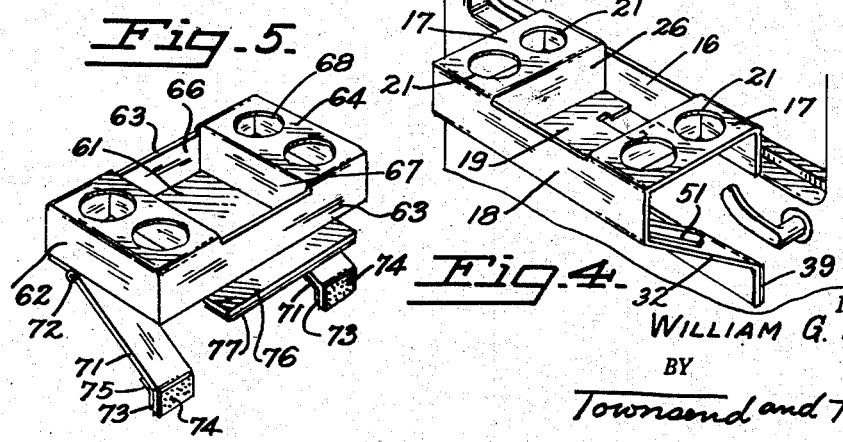
Fig. 4 is a schematic view showing the tray attached to the window ledge of an automobile.
Fig. 5 is a perspective view of a modification of the invention.

A modification of the invention is illustrated in Fig. 5 wherein a tray formed of plastic material is illustrated, said tray being of a semi-permanent character which is not normally discarded after a single use. The modification illustrated in Fig. 5 is attached to the vehicle or other stationary support in a manner similar to the modification shown in Figs. 1–4. A rectangular box is provided having a bottom 61, ends 62, and sides 63. The top 64 of said tray is indented to form a rectangular central compartment 66, there being vertical members 67 interconnecting top 64 and bottom 61 and cooperating with sides 63 to define said central well compartment 66. Apparatus 64, similar to apertures 21 heretofore described, are located in top 64 at either end of central compartment 66. At either end of the tray leg 71 is attached by means of hinge 72 to bottom 61, each said leg 71 being formed with an oblique portion 73 at its extremity joined by tape 75, the outer surface of said portion 73 being covered with sticky tape 74, which functions in the same manner as tape 39 of the preceeding modification. At the center of the tray a projection 76 of bottom 61 is provided, the lower surface of which bears sticky tape 77 similar in function to tape 37 previously identified.

Thus, in use, the legs 71 are folded against bottom 61 while the food and beverages are being carried from the dispensing station to the vehicle. Upon arrival, legs 71 are folded down at an acute angle and the tapes 77 and 74 employed to fasten the tray onto the window ledge or other suitable portion of the vehicle while the tray is being used. The modification shown in Fig. 5 is particularly useful where the tray is owned by the consumer. For example, the operators of loaded trucks and the like may employ the tray after purchasing food and beverages to transport the items purchased to their trucks, thereby lessening the danger of merchandise being stolen from the truck while the operator is dining. The modification is initially more expensive, but has the advantage of being capable of repeated use.

The modification of Fig. 6 resembles that of Fig. 5 in general construction and use. The tray is formed of plastic material or the like and has a bottom 81, ends 82 and sides 83. It further has apertures (not shown) in the top resembling apertures 68 and 66 of Fig. 5. A single slant leg 84 is attached at about the midpoint of one bottom edge of the tray, said leg 84 being attached to the bottom by a hinge, such as a strip of adhesive material 86 or the like. The extremity 87 of leg 84 is hingedly connected to the major portion thereof by adhesive tape 88 and further provided with sticky tape 89. A pair of tabs 91 extend out from the opposite bottom edge of the tray, said tabs 91 being at or adjacent opposite ends of the tray. Adhesive tape 92 or the like affords a flexible connection between tabs 91 and the tray to permit conformation of the tabs to the contour of the surface to which the tabs are attached, it being understood that the underside of tabs 91 is provided with sticky tape 93 to facilitate attachment.

Still another modified tray is shown in Figs. 7–10. The blank from which the tray is assembled is shown in Fig. 7, said blank being provided with a pair of transverse score lines 101 and 102 offset to the left of the middle of the blank and spaced apart a distance equal to the depth of the tray. The panel 103 of the blank to the left of score line 101 is the top of the tray and is provided with a plurality of circular apertures 104 for the reception of glasses. U-shaped line 106 provides the central well 107 in the top of the tray. The slant leg 108 for the tray is formed by the stock between two converging cut lines 109 which extend from the left edge of bottom panel 111 to the right of transverse score line 102 through side panel 112 between lines 101 and 102, through the well portion 107 of top panel 103 and terminate in two short longitudinally extending lines 113 which in turn terminate spaced slightly inward from the left edge of the blank. Transverse score line 114 divides end 116 of leg 108 from the major portion thereof and facilitates conformation of the leg to the contour of the object to which the leg is attached by means of sticky tape 117 on the underside of end 116. The right hand end of leg 108 is hinged to bottom panel 111 by transverse score line 118, there being a pair of semi-circular cutouts 119 along score line 118 which, when leg 108 is folded down, provide upstanding lugs 121 to retain objects in well 107 provided by cut line 106.

A pair of tabs 121a are formed on the right hand end of the blank, being connected to the major portion of the blank by transverse score lines 122. Sticky tape 123 is applied to said tabs 121a so that they may be attached to a substantially horizontal surface, score lines 122 facilitating conformation to the contour of said surface. An ear 124 is formed on the right hand end of the blank by means of transverse score line 126 spaced to the left of the right margin of the blank, converging cut lines 127 and outwardly extending edges 128, longitudinal edges 129 and transverse end 131, all as shown in Fig. 7. Said ear 124 cooperates with recess 132 in top panel 103 to lock the tray into assembled position, as shown in Figs. 8–10.

Thus top 103 is folded over bottom 111 along score lines 101 and 102, and ear 124 is folded up to interlock with recess 132 and hold top 103 and bottom 111 in spaced apart, parallel relation. Comestibles may then be transported with the aid of apertures 104 and well 107. Leg 108 may be folded downwardly along line 118 when it is desired to attach the tray to a stationary support, the downward folding of said leg 108 causing lugs 121 to stand up and assist in retaining objects within well 107. Sticky tape 123 on the underside of tabs 121a and sticky tape 117 on the end 116 of leg 108 assist in affixing said tabs 121a and leg 108 to a suitable substantially horizontal and substantially vertical surface, respectively, the flexible connection of said tabs 121a and end 116 provided by score lines 122 and 118 providing sufficient flexibility to permit the tray to be attached to surfaces which are not exactly horizontal and vertical.

A still further modification is illustrated in Figs. 11 to 14, inclusive. It will be seen that this modification resembles that of Figs. 7 to 10, inclusive, with the addition of a supporting strut 131 which provides additional strength for the tray support. The blank from which this tray is assembled is shown in Fig. 7, said blank being provided with a pair of transverse score lines 132 and 133 off-set to the left of the blank and spaced apart a distance equal to the depth of the tray, said score lines dividing the blank into top, side and bottom panels 134, 136 and 137, respectively. The panel 134 of the blank to the left of score line 132 is the top 134 of the tray and is provided with a plurality of circular apertures 138 for the reception of glasses and the like. U-shaped cut line 139 provides a central well 141 in the top of the tray. Slant leg 142 is formed from the stock between two converging cut lines 143 which extend from score line 133 through side panel 136 through the well portion 141 of top panel 134 and terminating to the left of U-shaped cut line 139, spaced inwardly from the left edge of the blank. Transverse cut line 144 connects the ends of lines 143 and separates the leg 142 from the blank. Transverse score line 146 divides end 147 of leg 142 down the major portion thereof and facilitates conformation of the leg to the contour of the object to which the leg is attached by means of sticky tape 148 on the underside of end 147. By means of cut lines 151 which are spaced apart a short distance and are located at the right hand end of slant leg 142 there is provided strut 131 formed of the stock of slant leg 142 but foldable at an angle with respect thereto by means of score lines 152 at the inner terminus of lines 151. The right hand edge of strut 131 is necked in by lines 153 to provide a pair of notches 154 which anchor the strut to bottom panel 137 as heretofore appears. Bottom panel 137 is provided with a hinged tab 156 mating with notches 154 of strut 131, said tab 156 being shaped to permit the end of strut 131 to project up through the bottom of the tray and lock therein as shown particularly in Figs. 12 to 14.

The right hand end of bottom panel 137 is provided with a tongue 157 hinged thereto by score line 155 having a necked end 158 adapted to engage the notch 159 formed in top panel 134 by means of the converging lines 143 and line 144. When said tongue 157 is folded perpendicular to said bottom panel 137 and when said necked end 158 is attached to notch 159, the top and bottom panels of the tray are spaced apart in parallel relationship. A pair of tabs 161 is provided on the right hand end of the bottom panel by means of score line 155 and the bottom of said tabs 161 is provided with adhesive 162 as in the other modifications previously described, said adhesive facilitating attachment of the bottom of the tray to a substantially horizontal surface. Score line 155 permits adjustment of the bottom of the tray to accommodate surfaces of varying structure.

In use, the tray is assembled by interlocking the end 158 of tongue 157 with notch 159 so as to position the top and bottom panels 134 and 137 in proper relationship. Slant leg 142 is folded down at an angle with respect to bottom 137 and strut 131 is folded upwardly with respect to slant leg 142 so that notches 154 of said strut lock to tab 156 in bottom 137. The adhesive 162 on the underside of tabs 161 anchors the bottom of the tray to a stationary support and adhesive 148 on end 147 of slant leg 142 engages another portion of said stationary support. (See Fig. 12).

Although the present invention has been described in some detail by way of illustration and example, for purposes of clarity of understanding, it is understood that certain changes and modifications may be made within the spirit of the invention and scope of the appended claims.

I claim:

1. A tray comprising an apertured top, a bottom, sides, a latch arranged when engaged to lock said top and bottom in spaced, substantially parallel relation, a pair of ears projecting outwardly from the edge of said bottom adjacent said latch, first adhesive on the underside of back of said ears, a leg flexibly connected to and integral with said bottom and said leg being attached to said bottom adjacent the edge of said bottom opposite said ears, said leg being arranged to be folded down at an acute angle to said bottom and extending below the opposite edge of said bottom, and second adhesive on the outer end of said leg.

2. A tray according to claim 1 in which a lug is integrally formed with the upper end of said leg to provide a stop to retain objects within one of said apertures when said leg is folded at an acute angle.

3. A tray according to claim 1 which further includes a supporting strut connected to said leg and having means to interlock with said bottom of said tray to locate said leg at an acute angle with respect to said bottom.

References Cited in the file of this patent
UNITED STATES PATENTS

| Number | Name | Date |
|---|---|---|
| 1,224,127 | Bartlett | May 1, 1917 |
| 1,446,231 | West | Feb. 20, 1923 |
| 2,296,028 | Gribble | Sept. 15, 1942 |
| 2,385,296 | Moore | Sept. 18, 1945 |
| 2,512,963 | Peiker | June 27, 1950 |